(12) United States Patent
Nelson et al.

(10) Patent No.: US 6,881,709 B2
(45) Date of Patent: Apr. 19, 2005

(54) VISCOSITY REDUCTION OF VISCOELASTIC SURFACTANT BASED FLUIDS

(75) Inventors: Erik B. Nelson, Houston, TX (US); Bernhard Lungwitz, Stafford, TX (US); Keith Dismuke, Katy, TX (US); Mathew Samuel, Punalur (IN); Golchi Salamat, Stafford, TX (US); Trevor Hughes, Cambridge (GB); Jesse Lee, Sugar Land, TX (US); Philip Fletcher, Houston, TX (US); Diankui Fu, Missouri City, TX (US); Richard Hutchins, Sugar Land, TX (US); Michael Parris, Richmond, TX (US); Gary John Tustin, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 186 days.

(21) Appl. No.: 09/826,127

(22) Filed: Apr. 4, 2001

(65) Prior Publication Data

US 2002/0004464 A1 Jan. 10, 2002

Related U.S. Application Data

(60) Provisional application No. 60/211,684, filed on Jun. 15, 2000, and provisional application No. 60/194,755, filed on Apr. 5, 2000.

(51) Int. Cl.[7] .............................. E21B 43/26; C09K 3/00

(52) U.S. Cl. .................. 507/203; 507/239; 507/240; 507/252; 507/266; 507/269; 507/267; 507/277; 507/921; 507/922; 166/308.2; 166/308.3

(58) Field of Search ........................... 166/308.2, 308.3, 166/308; 507/203, 239, 240, 252, 266, 269, 276, 277, 921, 922

(56) References Cited

U.S. PATENT DOCUMENTS

| | | | |
|---|---|---|---|
| 3,292,698 A | 12/1966 | Savins | 166/401 |
| 3,342,261 A | 9/1967 | Bond | 166/11 |
| 3,361,213 A | 1/1968 | Savins | |

(Continued)

FOREIGN PATENT DOCUMENTS

| | | |
|---|---|---|
| CA | 1109356 | 9/1981 |
| CA | 1298697 | 4/1992 |
| CA | 2217659 | 10/1997 |

(Continued)

OTHER PUBLICATIONS

M. Samuel et al., "Polymer–Free Fluids for Hydraulic Fracturing", SPE 38622 (1997).
M. M. Samuel et al., "Polymer–Free Fluid for Fracturing Applications," SPE 59478 (1999).

(Continued)

Primary Examiner—Philip C. Tucker
(74) Attorney, Agent, or Firm—Thomas O. Mitchell; Robin Nava; Brigitta L. Echols

(57) ABSTRACT

Methods and compositions are disclosed for controlled addition of components that decrease the viscosity of the viscoelastic surfactant fluids or for controlled changes in the electrolyte concentration or composition of the viscoelastic surfactant fluids. One aspect of the invention relates to the use of internal breakers with a delayed activation. Another aspect of the invention relates to the use of precursors that release a breaking system such as alcohol by a process such as melting, slow dissolution, reaction with a compound present in the fluid or added to the fluid during or after the step of injecting, rupture of an encapsulating coating and de-adsorption of a breaking agent absorbed into solid particles. In another aspect of the invention, alcohols are included in a pad to reduce the low-shear viscosity and reduce the resistance to flow of the treatment fluids during a desired phase of the treatment.

23 Claims, 10 Drawing Sheets

U.S. PATENT DOCUMENTS

| | | | | |
|---|---|---|---|---|
| 3,760,881 | A | | 9/1973 | Kiel .......................... 166/308 |
| 3,830,302 | A | | 8/1974 | Dreher et al. ............... 166/294 |
| 3,954,627 | A | | 5/1976 | Dreher et al. ............... 507/135 |
| 3,956,173 | A | | 5/1976 | Towle ........................ 252/316 |
| 4,061,580 | A | | 12/1977 | Jahnke ....................... 507/239 |
| 4,113,631 | A | | 9/1978 | Thompson ................. 252/8.55 |
| 4,148,736 | A | | 4/1979 | Meister ...................... 507/103 |
| 4,324,669 | A | | 4/1982 | Norman et al. ............ 252/8.55 |
| 4,418,755 | A | | 12/1983 | Sifferman |
| 4,432,881 | A | | 2/1984 | Evani |
| 4,591,447 | A | | 5/1986 | Kubala ........................ 507/239 |
| 4,615,825 | A | | 10/1986 | Teot et al. .................. 252/356 |
| 4,695,389 | A | | 9/1987 | Kubala .................... 252/8.553 |
| 4,725,372 | A | | 2/1988 | Teot et al. ................ 252/8.514 |
| 4,735,731 | A | | 4/1988 | Rose et al. ................ 252/8.51 |
| 4,741,401 | A | | 5/1988 | Walles et al. ............... 166/300 |
| 4,790,958 | A | | 12/1988 | Teot ........................... 507/203 |
| 4,806,256 | A | | 2/1989 | Rose et al. .................... 252/71 |
| 4,975,482 | A | | 12/1990 | Peiffer ........................ 524/535 |
| 5,009,799 | A | | 4/1991 | Syrinek et al. .......... 252/8.533 |
| 5,036,136 | A | | 7/1991 | Peiffer ........................ 524/812 |
| 5,093,448 | A | | 3/1992 | Peiffer ........................ 526/310 |
| 5,101,903 | A | | 4/1992 | Llave et al. ................. 166/294 |
| 5,203,411 | A | | 4/1993 | Dawe et al. ................. 166/274 |
| 5,258,137 | A | | 11/1993 | Bonekamp et al. ......... 252/356 |
| 5,310,002 | A | | 5/1994 | Blauch et al. ............... 166/307 |
| 5,551,516 | A | * | 9/1996 | Norman et al. ............. 507/922 |
| 5,964,295 | A | | 10/1999 | Brown et al. ............... 166/308 |
| 5,979,555 | A | | 11/1999 | Gadberry et al. ......... 166/270.1 |
| 5,979,557 | A | | 11/1999 | Card et al. ................... 166/300 |
| 6,035,936 | A | * | 3/2000 | Whalen ....................... 166/308 |
| 6,140,277 | A | * | 10/2000 | Tibbles et al. ............... 507/240 |
| 6,192,985 | B1 | * | 2/2001 | Hinkel et al. ............. 166/280.1 |
| 6,194,356 | B1 | | 2/2001 | Jones et al. .................. 507/225 |
| 6,232,274 | B1 | | 5/2001 | Hughes et al. ............... 507/240 |
| 6,258,859 | B1 | * | 7/2001 | Dahayanake et al. ....... 166/308 |
| 6,399,546 | B1 | * | 6/2002 | Chang et al. ................ 507/240 |
| 6,432,885 | B1 | * | 8/2002 | Vollmer ...................... 507/922 |
| 6,435,277 | B1 | * | 8/2002 | Qu et al. ..................... 166/281 |
| 2002/0193257 | A1 | * | 12/2002 | Lee et al. .................... 507/200 |

FOREIGN PATENT DOCUMENTS

| | | | |
|---|---|---|---|
| CA | 2257697 | 12/1998 | |
| CA | 2257699 | 12/1998 | |
| CA | 2320620 | 3/2001 | ......... E21B/43/267 |
| EP | 0 835 983 A2 | 4/1998 | |
| GB | 1388909 | 3/1975 | |
| GB | 2332223 A | 6/1999 | |
| GB | 2332224 A | 6/1999 | |
| WO | 92/10640 | 6/1992 | |
| WO | 92/12328 | 7/1992 | |
| WO | 94/09852 | 5/1994 | |
| WO | 96/31528 | 10/1996 | |
| WO | 98/56497 | 12/1998 | |
| WO | 99/24693 | 5/1999 | |
| WO | 99/50529 | 10/1999 | ........... E21B/43/02 |
| WO | 99/50530 | 10/1999 | ........... E21B/43/02 |

OTHER PUBLICATIONS

Database WPI, Section Ch, Week 9320, Derwent Publications Ltd., London, GB; AN 93–165551, XP002090141, & SU 1 724 859 A (Oil Ind Operations Des Res Inst), May 23, 1992 *Abstract*.

B. R. Stewart et al., "Use of a Solids–Free Viscous Carrying Fluid in Fracturing Applications: An Economic and Productivity Comparison in Shallow Completions," SPE 30114 (1994).

* cited by examiner

US 6,881,709 B2

VISCOSITY REDUCTION OF VISCOELASTIC SURFACTANT BASED FLUIDS

This patent application is a non-provisional application of provisional applications Ser. No. 60/194,755 filed Apr. 5, 2000 and Ser. No. 60/211,684 filed Jun. 15, 2000.

TECHNICAL FIELD OF THE INVENTION

This invention relates to compositions and methods used in reducing the viscosity of viscoelastic surfactant (VES) fluids, especially for use in treatment of subterranean formations and oil and gas wells.

BACKGROUND OF THE INVENTION

Viscoelastic surfactant fluids are normally made by mixing in appropriate amounts suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting elastic behavior. In the remaining part of this description, the term "micelle" will be used as a generic term for the organized interacting species.

Viscoelastic surfactant solutions are usually formed by the addition of certain reagents to concentrated solutions of surfactants, frequently consisting of long-chain quaternary ammonium salts such as cetyltrimethylammonium bromide (CTAB). Common reagents that generate viscoelasticity in the surfactant solutions are salts such as ammonium chloride, potassium chloride, sodium salicylate and sodium isocyanate and non-ionic organic molecules such as chloroform. The electrolyte content of surfactant solutions is also an important control on their viscoelastic behaviour.

There has been considerable interest in using such viscoelastic surfactants as wellbore service fluids. Reference is made for example to U.S. Pat. No. 4,695,389, No. 4,725,372, No. 5,551,516, No. 5,964,295, and No. 5,979,557.

Introduction of additional components to the fluid can cause a dramatic decrease in the fluid viscosity, called "breaking". This can occur even with components, such as water or electrolytes, that may already be present in the fluid. For example, in oilfield applications, the viscosity of viscoelastic surfactant fluids is reduced or lost upon exposure to formation fluids (e.g., crude oil, condensate and/or water); and this viscosity reduction or loss effectuates cleanup of the reservoir, fracture, or other treated area.

However, in some circumstances, it would be suitable to have a better control of that breaking, for instance, when breaking of the fluid is desired at a particular time or condition, when it is desired to accelerate viscosity reduction, or when the natural influx of reservoir fluids (for example, in dry gas reservoirs) does not break or breaks incompletely the viscoelastic surfactant fluid. This disclosure describes compositions and methods employed to break viscoelastic surfactant fluids.

Gel breakers are of common use for conventional polymer based fluids used in stimulation and the like since, unlike viscoelastic surfactant based fluid, conventional based polymers fluids do not spontaneously break when contacted by hydrocarbons or aqueous formation fluids and leaving a high-viscosity fluid in the formation would result in a reduction of the formation permeability and consequently, a decrease of the production. The most widely used breakers are oxidizers and enzymes. The breakers can be dissolved or suspended in the liquid (aqueous, non-aqueous or emulsion) phase of the treating fluid and exposed to the polymer throughout the treatment (added "internally"), or exposed to the fluid at some time after the treatment (added "externally"). The most common internal methods and compositions for conventional polymer based systems involve soluble oxidizers or enzymes; the most common external methods and compositions involve encapsulated enzymes or encapsulated oxidizers or involve the use of pre- or post-flushes that contain breakers. Breaking can occur in the wellbore, gravel-pack, filter cake, the rock matrix, in a fracture, or in another added or created environment.

UK Patent GB2332223, "Viscoelastic surfactant based gelling composition for wellbore service fluids" by Hughes, Jones and Tustin describes methods to delay and control the build-up of viscosity and gelation of viscoelastic surfactant based gelling compositions. These methods are used to facilitate placement of the delayed ("pre-gel") fluid into a porous medium and then to trigger formation of the viscoelastic gel in-situ.

Rose et. al. describe in U.S. Pat. No. 4,735,731 several methods to reversibly break the viscosity of VES solutions through an intervention at surface. These methods include heating/cooling the fluid, adjusting the pH or contacting the fluid with an effective amount of a miscible or immiscible hydrocarbon and then, subjecting the fluid to conditions such that the viscosity of the fluid is substantially restored. The reversible treatment of Rose is useful for drilling fluids so that the fluid pumped into the well is viscous enough to carry cuttings to the surface but able to be broken at surface for solids removal. The breaking methods discussed in Rose are not used to break a viscoelastic solution down a well and further appear to have an immediate impact on the viscosity of the fluid.

Therefore, there exists a need for methods for breaking viscoelastic surfactant fluids after subterranean oil or gas well treatments, at predetermined times or conditions and/or when they are not broken by the natural influx of reservoir fluids.

SUMMARY OF THE INVENTION

Compositions and methods for initiating, controlling or enhancing the cleanup of viscoelastic surfactant fluids with breaker agents are described. Breakers may be internal, external or a combination thereof. These compositions and methods are focused upon but not limited to breakers for viscoelastic surfactant systems based upon cationic surfactants such as erucyl methyl bis(2-hydroxyethyl) ammonium chloride (hereinafter referred to as "EMHAC") and zwitterionic surfactants such as betaine surfactants. However, methods and compositions are also presented for breaking viscoelastic surfactant fluids based on anionic, cationic, nonionic and zwitterionic surfactants.

Various types of alcohols, organic acids and salts are known to impart a reduction of the viscosity of a viscoelastic gel—or even to completely "break" the gel. For the tested compositions, it has been found that these breaking agents have the following efficiency:

| Type of breakers → Type of surfactant ↓ | Salts | Alcohols | Acids |
|---|---|---|---|
| cationic | Good | Good | Very weak |
| anionic | Weak | Good | Good |
| Zwitterionic | Good | Good | Good |

It is one aspect of the invention to provide methods and compositions for the delayed breaking of such viscoelastic surfactant gelling compositions without compromising the initial fluid properties required for proppant suspension and transport during the fracturing operation. The invention thus concerns a method of treating a subterranean formation by injecting down a well an aqueous fluid comprising a thickening amount of a viscoelastic surfactant comprising providing a breaking system—or a precursor of a breaking system—that causes a reduction in viscosity of the fluid after its injection but does not significantly impact its viscosity at surface or during the injection. Optimized formulations ensure that the viscoelastic gel is rapidly formed under surface conditions, remains stable during pumping and placement into the fractures. Then, at a later time, the gel viscosity is significantly reduced by the controlled release of a gel breaking system.

The following simplified sequence describes a preferred application of the compositions of the present invention:

(A) At surface, during pumping and formation of propped fracture:

Combination and pumping of a known viscoelastic surfactant gel+additive A developing into a viscoelastic surfactant gel.

(B) After reversing the pumping direction (backflow regime):

The additive A (either through an internal process or after adding a second additive) releases at least one component B, which reduces the gel strength of viscoelastic surfactant gel. Both processes are designed to delay the effect of gel strength reduction to a point in time when the viscoelastic surfactant gel is present in the fracture and formation.

Thus, according to one aspect of the invention, a precursor is provided that releases a breaking system by at least one of the following process: melting, slow dissolution, reaction with a compound present in the fluid or added to the fluid during or after the step of injecting, rupture of an encapsulating coating and de-adsorption of a breaking agent absorbed into solid particles.

The initial additive A, when applied as an internal breaker, is preferably a water soluble compound. The properties of A, in particular, hydrophilic lipophilic balance (HLB) and charge characteristics, are such that the properties of the viscoelastic surfactant gel are not significantly affected by its presence until a reaction occurs that generates a sufficient concentration of B (and more reaction products) to disrupt the micelles and reduce the fluid's gel strength and fluid viscosity during backflow.

The most preferred examples of A are esters, isothionates, sarcosinates, alcohol sulfates, alcohol ether sulfates, alcoholphenol ether sulfates, carboxylate anions, ethoxycarboxylate anions and ester carboxylates. These products will react to release an alcohol or a carboxylic acid breaker for instance through hydrolysis.

Another aspect of the invention relates to encapsulated salts. Viscoelastic surfactant fluids achieve viscosity by forming micelles in the presence of an electrolyte. The micelles can take a number of forms, including worm-like, rod-like, spherical, laminar, or vesicular. The optimum viscosity is only achieved when the concentration of the electrolyte falls within a given range. For example, in the case of EMHAC, the optimum window is generally between 0.6M–0.8M (molar). The presence of an encapsulated salt in the fracturing fluid would not affect the rheology during placement. Upon fracture closure the proppant grains would crush the capsules allowing the release of the extra salt; consequently, the electrolyte concentration would fall outside the optimum range and the fluid viscosity would fall. Encapsulated ammonium persulfate is particularly useful. Other encapsulated materials may include organic salts such as sodium salicylate, inorganic salts such as $NaPF_6$ (sodium hexafluorophosphate) and KCl (potassium chloride), and liquid hydrocarbons or surfactants such as sodium dodecyl sulfate. In fact, any salt that is sufficiently soluble in the treatment fluid and would disrupt the micelle structure would be appropriate.

The extra salt can also be released by the delayed decomposition of a compound that generates chlorides. A similar effect can be achieved through a delayed decomposition of a salicylate generator such as the esters, methyl salicylate and ethyl salicylate. The decomposition of the latter compounds releases alcohol, which may induce a further viscosity reduction.

Furthermore, other materials, as indicated in further embodiments above, such as solid or liquid organic compounds such as alcohols such as dodecyl alcohol or surfactants such as sodium dodecyl sulfate may be encapsulated and employed in this manner. U.S. Pat. No. 4,741,401 to Walles et al. discloses controlled release encapsulated materials in which the encapsulated materials are released at least in part by capsule crushing. U.S. Pat. No. 3,956,173 discloses encapsulated potassium salts, including potassium chloride, from which the encapsulated potassium salts are released at least in part by dissolution in water of the encapsulating material. Other mechanisms, such as osmotic or chemical diffusion, have been reported. In all cases, the breaking agent is released through the rupture of the encapsulating coating.

Another aspect of the invention relates to slowly acting breakers. One type of slowly acting breaker is uncured, or partially cured resin coated proppants. When these are included in treatments of subterranean formations that include proppants, the resin coating on the proppant will cure at a certain time or temperature and cause the proppant particles to adhere to one another. This is often desirable to prevent flowback of particles into a well. We have found that the curing agents (usually phenols and amines) in most resin coated proppants are incompatible with viscoelastic surfactant fluids. The resin can be formulated to release the curing agent rapidly or very slowly, resulting in a long or brief delay in the degradation of the viscoelastic surfactant fluid.

One type of soluble breaker comprises surfactants having hydrophilic headgroups oppositely charged to the hydrophilic headgroups of the anionic or cationic surfactants that make up some viscoelastic surfactant fluids, in other words, that are oppositely charged to the surfactants that form the viscoelastic surfactant fluid. $C_{18}$ to $C_{20}$ sulfates have been shown to reduce the viscosity of cationic viscoelastic surfactant fluids very efficiently. As an example, the anionic surfactant sodium dodecyl sulfate ($C_{12}$ sulfate) breaks viscoelastic surfactant fluids that are based on quaternary amine surfactants such as EMHAC and the like but such use of the sulfate also requires a delaying agent or method. Other examples include alkyl or aryl phosphates or phosphonates or carboxylic acids, for example soaps such as fatty acids. When such materials are not naturally slowly dissolving, they would need to be encapsulated or adsorbed for slow release as described in other embodiments herein. Absorption, for example, may be in carboceramic proppants or zeolites.

Other slowly soluble breakers are selected among materials, solids or liquids at surface temperature and initially either insoluble or immiscible with the viscoelastic surfactant fluid. In time, especially at elevated temperatures, the breakers slowly release molecules into the fluid and disrupt the micelle structure. One example is immiscible fluids that form an emulsion in the viscoelastic surfactant fluid. A more specific example is alkyl amines; a preferred example is dodecyl amine. Other examples would include solid hydrocarbons such as alkanes, alkenes and aromatics, including substituted compounds, with suitable dissolution rates.

Yet another aspect of this invention relates to melting point released breakers. Any material with a suitable melting point that is a viscoelastic surfactant fluid breaker when it is in liquid form can be used. The viscosity reduction is irreversible; later cooling the fluid does not restore the fluid performance. $C_{12}$ to $C_{18}$ alcohols have relatively high melting points. Other examples would include hydrocarbons such as alkanes, alkenes and aromatics, including substituted compounds, with suitable melting points. Solids with relatively high melting points are also useful to encapsulate breakers described in other embodiments herein.

Yet one more aspect of the present invention relates to the inclusion of breaking agent under the form of small particles or as impregnation materials onto porous or non-porous, natural or synthetic, small particles—for example by absorption or adsorption onto carboceramic proppants or zeolites. Particles having a diameter ranging within $1/1000$ microns and $10/1000$ microns (nanoparticles) would be of particular interest since they are small enough to enter the matrix along with part of the stimulation or other treatment fluid. The active nanoparticles, or the agent they release, would be considered to be a type of internal agent if or to the extent that they are present in the fluid, or an external agent if they initially enter the matrix and then are released or release an agent that then flows into the fluid to be broken. Such a system may be added throughout the stimulation or other treatment or at any time during the treatment, such as in the pad or pre- or post-flush.

Another particular aspect of this invention relates to inclusion of alcohols in a first fluid pad or preflush introduced before the main fluid. In various treatments, the pad improves or optimizes conditions to enhance the effectiveness of the main fluid; for example, in fracturing, the pad may be a non-proppant containing fluid of different composition from the main fluid that contains proppant.

As mentioned before, introduction of an alcohol to a viscoelastic surfactant fluid reduces its viscosity. More precisely, alcohol reduces the viscosity at low-shear rate (typically less than 1 sec$^{-1}$) while essentially not altering the viscosity at medium-shear rate (around 100 sec$^{-1}$). For a fluid to carry proppant, the fluid must be viscous at low-shear rate. On the other hand, the creation and maintenance of fracture width essentially depends on the medium to high-shear viscosity. Most fracturing jobs are designed to include a first pad stage with a proppant-free fracturing fluid, followed by the proppant stage. Addition of alcohol during this pad stage will consequently not significantly affect this initial stage. For the remaining part of the fracturing job, proppant will be added while addition of alcohol will cease to allow fluid to transport proppant.

It should be noted that alcohol also increases the leakoff behavior of the fracturing fluid. For low permeability formation—especially if the formation permeability is less than 1 milliDarcy—this is not a disadvantage since the formation surrounding the fracture will be soaked with a fluid with improved cleanup properties. Consequently, once the pressure is released, the fluid will more easily flow out of the matrix, leading to a better cleanup along the whole length of the fracture. Due to extensive fluid loss, it is normally not recommended to add alcohol for high formation permeability.

In another variant of the invention, the alcohol can be included into the pre-pad fluid. The pre-pad is a fluid usually comprising water, a solvent and a salt such as KCl, typically injected into the formation at the very initial stage of the fracturing treatment.

It should be understood that the various methods and combinations of the invention can be combined, so that for instance breakers of same or different types may be used either sequentially or simultaneously. The breakers can also be included in part of the fluid—for instance in the leading or the tail fluid. For instance, a fast acting breaker will usually be only included with the last part of the fluid to avoid premature breaking of the initially injected fluid. In some cases, the compositions of the invention may also be used even if there are naturally available fluids that will eventually break the viscoelastic surfactant fluids, to improve control of that breaking.

It should be also understood that the fracturing compositions of the invention may contain components in addition to water, electrolytes surfactants and breakers. Such additional components are, for example, acids, bases, buffers, chelating agents for the control of multivalent cations, freezing point depressants, and the like.

Even if the present application is focused on treatments of hydrocarbon wells, the methods and compositions of the invention can also be employed for other applications where the same type of fluids are used, for example, in water wells, in treatments for the recovery of coalbed methane, and in methods for the containment or remediation of ground or groundwater contamination.

Different examples for breaking a gel of concentrated viscoeleastic surfactants are described below:

EXAMPLE 1

Addition of Alcohol

Figure 1:
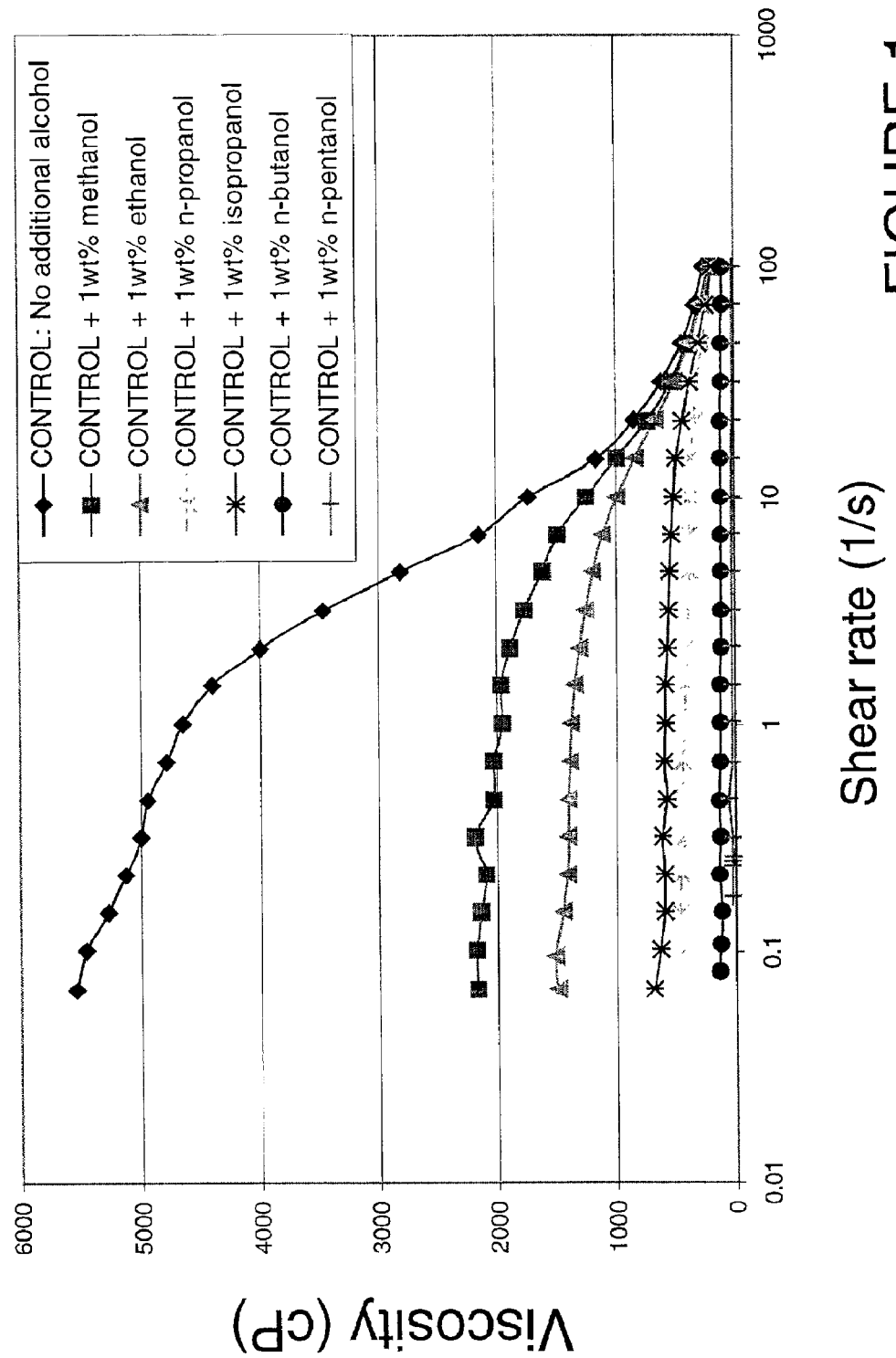
FIG. 1 shows the effect of adding various alcohols on the fluid rheology of a typical viscoelastic surfactant based gelling composition.

The viscosity of an aqueous solution comprising viscoelastic surfactants consisting of long chain quaternary ammonium salts is reduced by the addition of alcohol. FIG. 1 shows the effect of adding various alcohols on the flow rheology of a typical viscoelastic surfactant based gelling composition containing 3wt % erucyl methyl bis(2-hydroxyethyl) ammonium chloride (EMHAC), 1 wt % isopropanol and 3 wt % ammonium chloride.

All tested alcohols significantly decrease the viscosity at low shear-rate, with an efficiency increasing with increasing chain length ($C_1$ to $C_5$).

With the smaller chain length alcohol (especially with methanol and ethanol), at higher shear-rate the fluid viscosity is essentially the same as the one measured for the reference fluid with no alcohol. It is believed that during fracture creation, most fracturing fluids are subject to a shear rate between about 20 and 150 $s^{-1}$—and consequently the addition of alcohol makes it possible to lower viscosity at low shear-rate (like during clean-up) while essentially not reducing the effective viscosity in the fracture.

Figure 2:
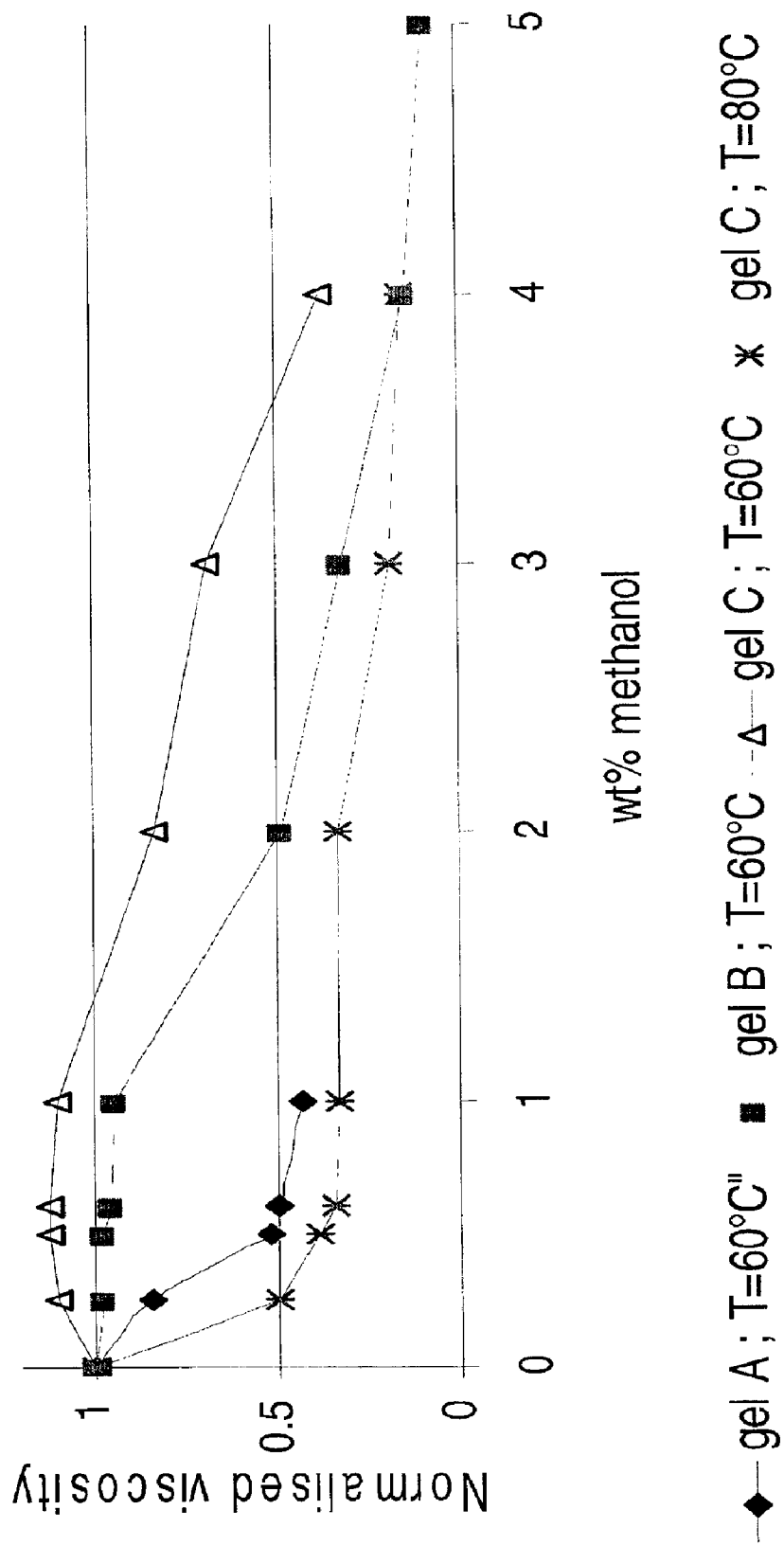
FIG. 2 shows the effect of methanol concentration on the normalised viscosity of various viscoelastic surfactant based gelling compositions at 60° C. and 80° C.

FIG. 2 shows the effect of methanol concentration on the normalized viscosity, ($\eta_{ls-1}$ with methanol)/($\eta_{ls-1}$ without methanol), of various viscoelastic surfactant based gelling compositions at 60° C. and 80° C. At 60° C., gel A (3 wt % surfactant, 1 wt % isopropanol, 3 wt % NH$_4$Cl) is broken by about 0.5 wt % methanol whereas less or equal than 2 wt % methanol is required to break gel B (3.375 wt % surfactant, 1.125 wt % isopropanol, 0.75 wt % hm-polyacrylamide, i.e. hydrophobically modified-polyacrylamide, 3 wt % NH$_4$Cl). At 60° C., gel C (3.375 wt % surfactant, 0.75 wt % hm-polyacrylamide, 3 wt % NH$_4$Cl) tolerates a higher methanol concentration than gel B but, at 80° C., gel C is readily broken by only about 0.5 wt % methanol. Thus, the critical concentration of alcohol required to break the gel depends on alcohol type, fluid composition and temperature.

EXAMPLE 2

Addition of Ether

The method relies on the use of an ester (R'COOR") which has little effect on the rheology of the viscoelastic gel but which can decompose to generate alcohol (R"OH) at a concentration greater than or equal to the critical concentration required to break the gel, where R' and R" are aromatic, saturated, or unsaturated, hydrocarbon chains.

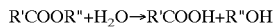

Since some organic acids are also efficient to break a gel comprising a VES (see example 3), addition of ester can indeed be very effective—provided the hydrolysis occurs at appropriate time. A similar effect can be achieved by using the appropriate dibasic or tribasic ester.

Figure 3:
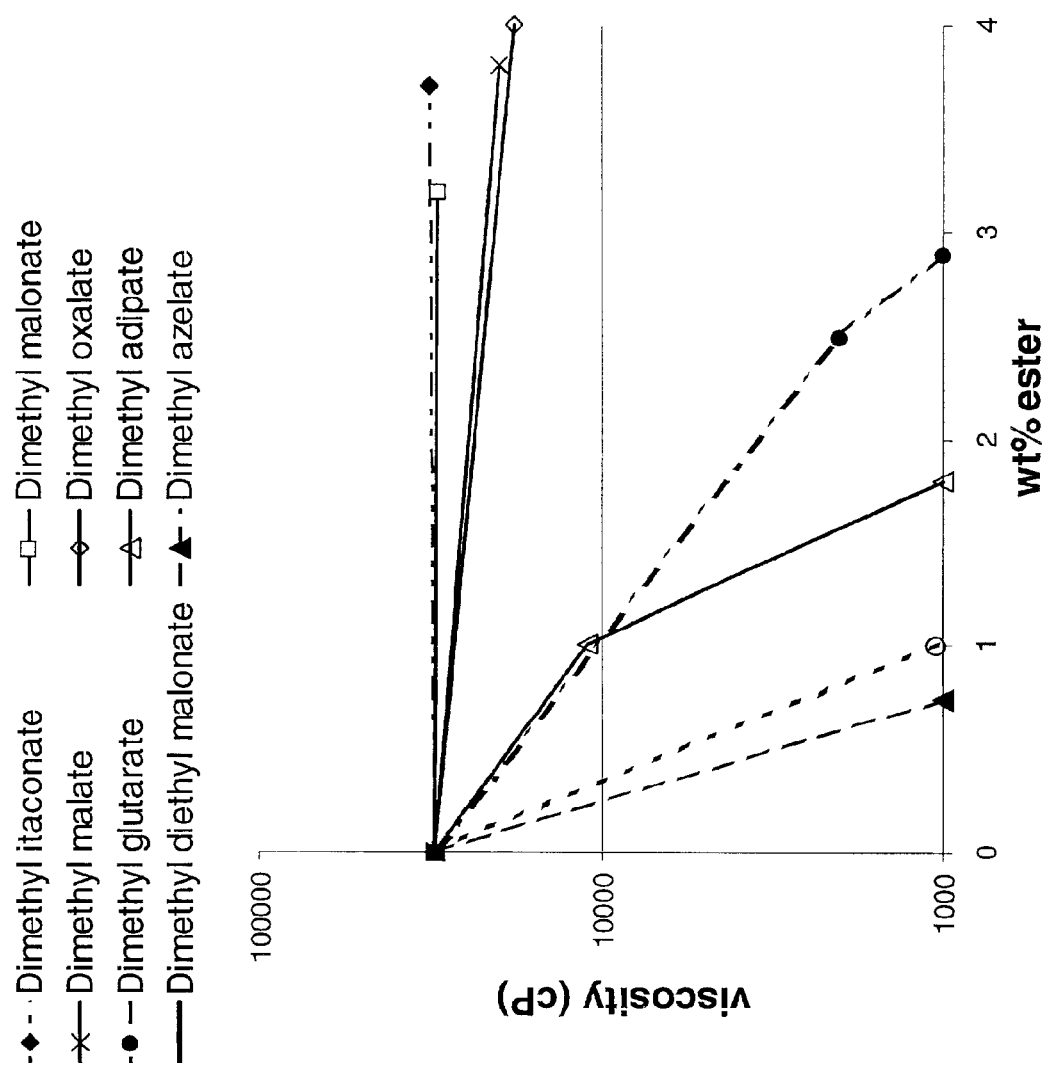
FIG. 3 shows the effect of adding various methyl diesters to a viscoelastic gel.

FIG. 3 shows the effect of adding various methyl diesters to gel B defined in example 1. In contrast to the more hydrophobic diesters (dimethyl glutarate, dimethyl adipate, dimethyl diethyl malonate and dimethyl azelate), the more hydrophilic esters (dimethyl itaconate, dimethyl malonate, dimethyl malate and dimethyl oxalate) have little effect on the low shear viscosity of the gel when added at a concentration in the range 3–4 wt %. When fully decomposed, 4 wt % dimethyl oxalate generates 2.2 wt % methanol which, as shown in FIG. 2, is sufficient to break gel B at 60° C. or gel C at 80° C.

Similarly, the more hydrophilic ethyl diesters, e.g. diethyl oxalate, or methyl monoesters, e.g. methyl acetate or methyl formate, can be used to achieve a similar delayed breaking of the gel.

EXAMPLE 3

Addition of a Salt of an Organic Acid

Some organic acids are efficient gel breaker. The acid can be provided encapsulated or as a salt. Then, under acidic conditions, the following reaction occurs:

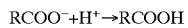

The salt shall be selected so that RCOO$^-$ has little or no effect as an effective counterion in the viscoelastic gel. Examples of suitable anions are:

salicylate anion/salicylic acid: 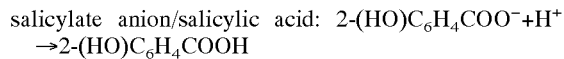

adipate anion/adipic acid: 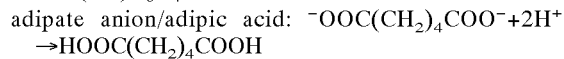

versatate anion/versatic acid: 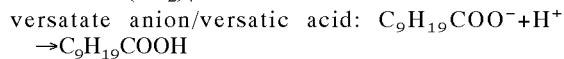

glutarate anion/glutaric acid: 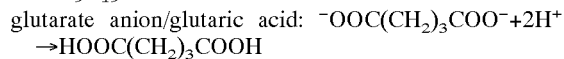

In this example, the initial fluid pH is greater than the pK$_a$ of the carboxylic acid so that the concentration of RCOO$^-$ is greater than the concentration of RCOOH. At the appropriate time, lower pH conditions are generated so that the concentration of RCOOH increases and becomes greater than the concentration of RCOO$^-$. Lower pH conditions can be generated by the hydrolysis of an ester, as explained in example 1. Again, the ester type and concentration is chosen such that there is little or no effect on the Theological properties of the viscoelastic surfactant gel.

Figure 4:
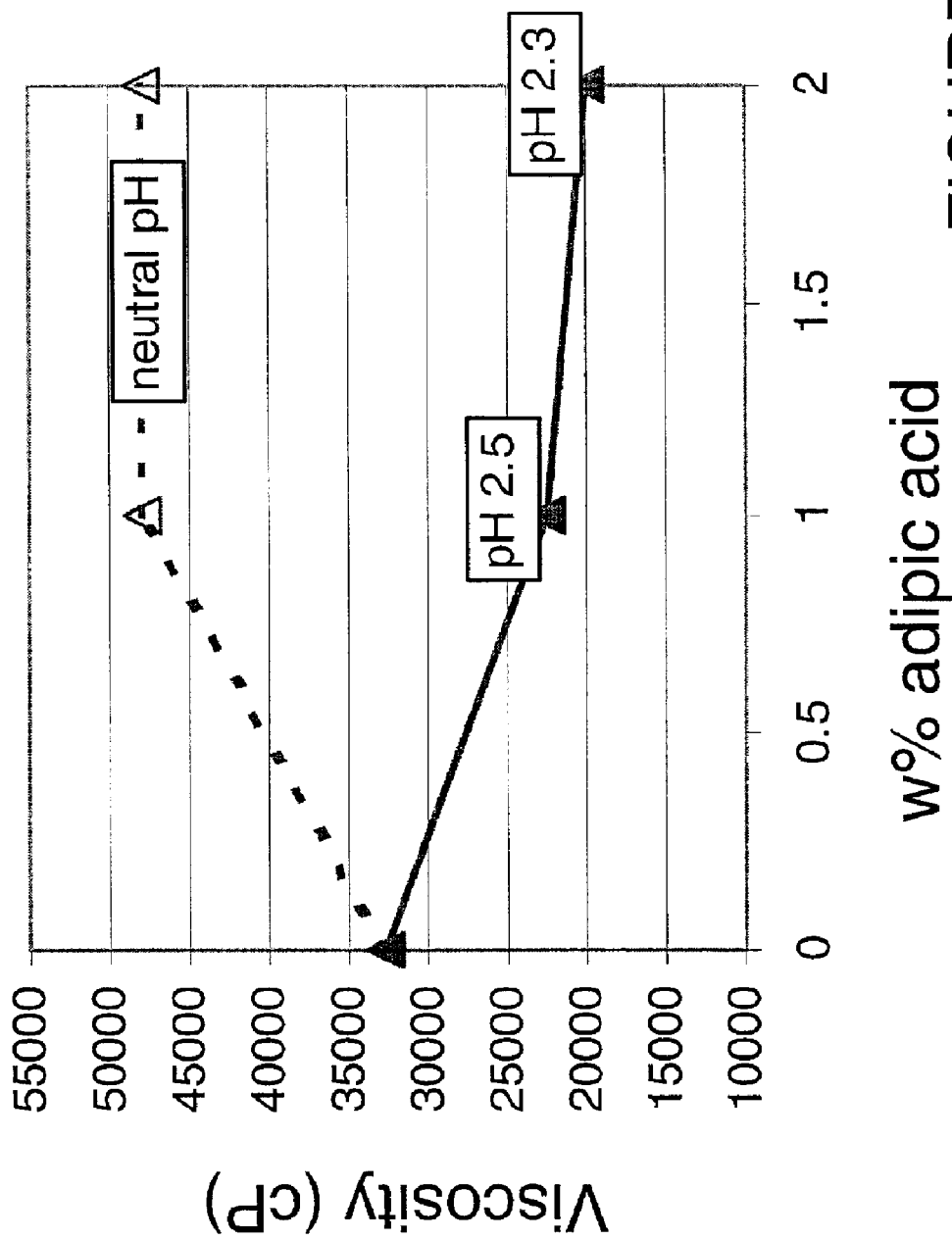
FIG. 4 shows the effect of adipate anion, and adipic acid, on fluid viscosity at neutral and low pH conditions, respectively.

FIG. 4 shows the effect of the addition of adipic acid—under different pH conditions—on the viscosity (measured under a shear rate of 1 $s^{-1}$, at 25° C.) of a gelling composition containing 3.375 wt % erucyl methyl bis(2-hydroxyethyl) ammonium chloride (EMHAC), 1.125 wt % isopropanol, 0.75 wt % hm-polyacrylamide and 4 wt % potassium chloride. The adipate anion is an effective counterion, which enhances fluid viscosity at neutral pH but equivalent concentrations of adipic acid reduce viscosity under low pH conditions.

Figure 5:
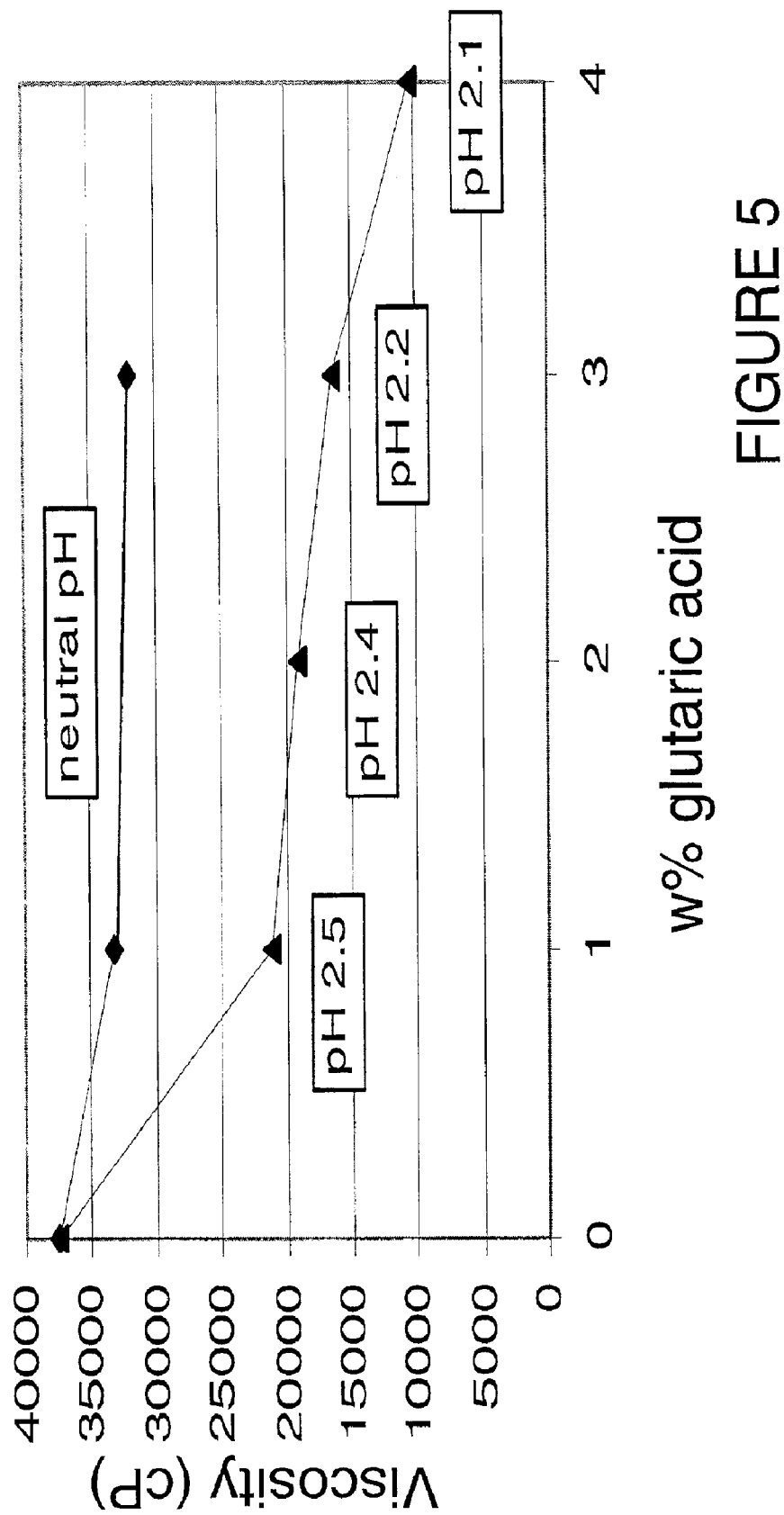
FIG. 5 shows the effect of glutarate anion, and glutaric acid, on fluid viscosity at neutral and low pH conditions, respectively.

Similarly, FIG. 5 shows the effect of different concentrations of glutaric acid under different pH conditions on the viscosity measured under a shear-rate 1 $s^{-1}$, at 25° C. on the same gelling composition. The fluid viscosity is only slightly reduced by the glutarate anion, at neutral pH, but equivalent concentrations of glutaric acid, reduce viscosity under low pH conditions.

Figure 6:
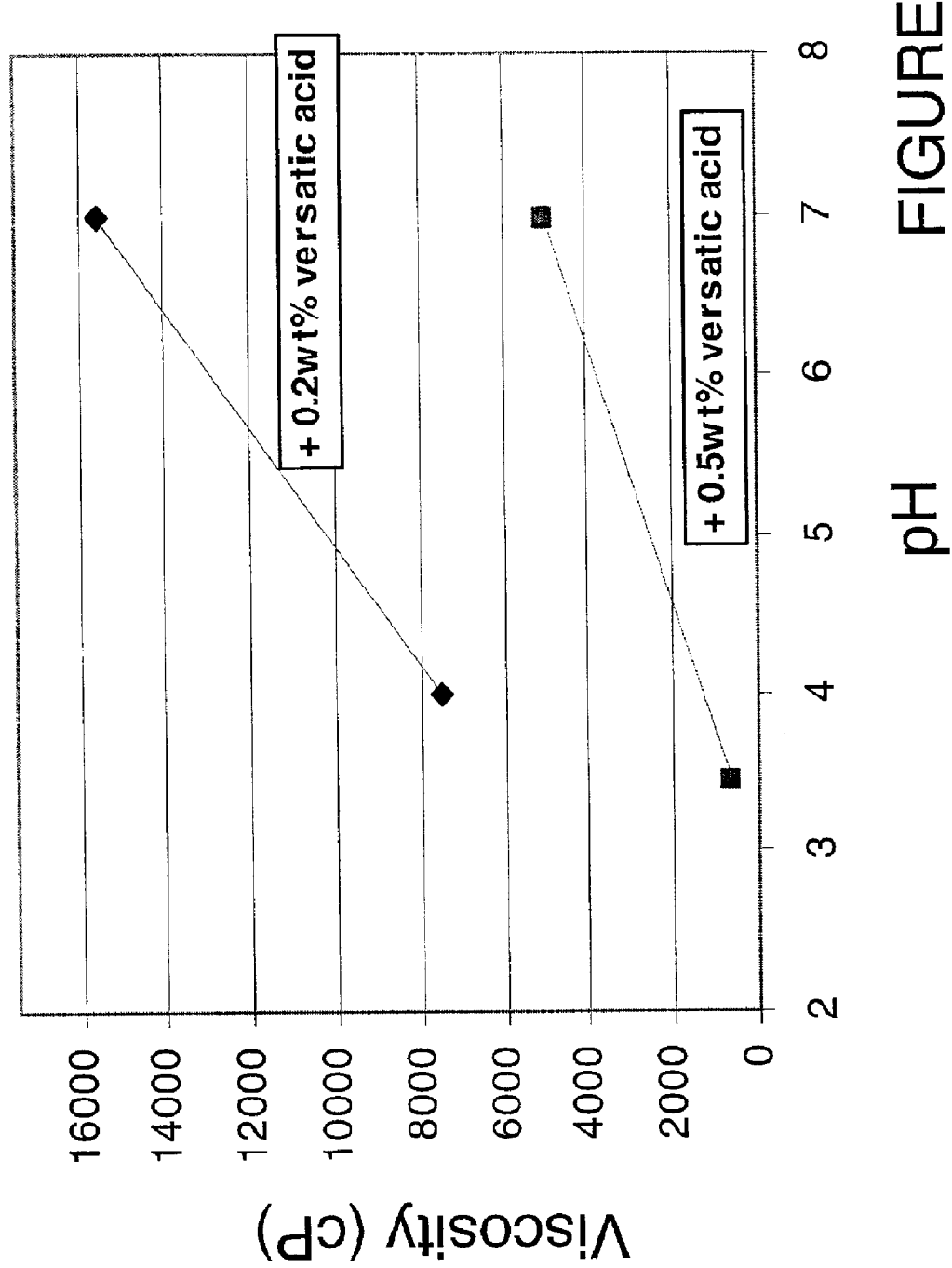
FIG. 6 illustrates the use of versatic acid under low and neutral pH conditions.

Finally, FIG. 6 shows that versatic acid is an efficient breaker under low pH conditions but, at neutral pH, where the concentrations of versatate and versatic acid are about the same, the gel maintains a high viscosity. The tests in FIG. 6 were performed on a gelling composition containing 4.5 wt % erucyl methyl bis(2-hydroxyethyl) ammonium chloride (EMHAC), 1.5 wt % isopropanol, 0.5 wt % hm-polyacrylamide and 3 wt % ammonium chloride.

With zwitterionic surfactants such as betaine surfactants, citric acid $HOC(CH_2CO_2H)_2COOH$ is a preferred breaking system.

EXAMPLE 4

Addition of Organic Sulfate Salts

Long chain alcohols can be generated by the acid hydrolysis of organic sulfate salts such as (i) $R\text{—}OSO_3X$, where R is a saturated linear hydrocarbon chain and X is an alkali metal (e.g. sodium lauryl sulfate, $C_{12}H_{25}SO_4Na$) or (ii) $RO(CH_2CH_2O)_nSO_4X$ (alcohol ether sulfate) where R is a saturated linear hydrocarbon chain, typically with 10–15 carbon atoms, n is in the range 2–10 and X is typically sodium, magnesium or ammonium.

Acid hydrolysis of $R\text{—}OSO_3X$ or $RO(CH_2CH_2O)_nSO_4X$ at elevated temperatures (typically >50° C.) releases sulphuric acid which catalyses the hydrolysis, e.g. under acid conditions, $R\text{—}OSO_3X + H_2O \rightarrow ROH + H_2SO_4$. Certain concentrations of alkyl sulfates (e.g. sodium lauryl sulfate, $C_{12}H_{25}SO_4Na$) or alcohol ether sulfates (e.g. $C_{14}H_{29}O(CH_2CH_2O)_{2-3}SO_4NH_4$) are effective co-surfactants in viscoelastic surfactant gelling compositions where the viscoelastic surfactant component is cationic, e.g. erucyl methyl bis(2-hydroxyethyl) ammonium chloride (EMHAC).

Thus, in the application to the fracturing process, low concentrations of organic sulfate co-surfactants can be used to enhance gel strength and viscosity during pumping and formation of the propped fracture but then a sufficient concentration of long chain alcohol can be released to break the gel during the backflow phase.

EXAMPLE 5

Addition of Polymers

In the application of viscoelastic surfactant based gelling compositions comprising viscoelastic surfactants in combination with hydrophobically modified water soluble polymers, the delayed release of a breaker compound can be achieved by hydrolysis of the hydrophobic groups on the polymer. For example, an alcohol breaker can be generated by acid hydrolysis of the alkyl acrylate or alkyl methacrylate groups in a co-polymer with acrylamide using the reaction:
[—$CH_2$ $CH(CONH_2)$]$_n$[—$CH_2$—$CR'(COOR'')$]$_m$+$H_2O \rightarrow$
[—$CH_2$—$CH(CONH_2)$]$_n$[—$CH_2$—$CR'(COOH)$]$_m$R"OH
where R' is hydrogen or methyl and R" is a linear or branched saturated hydrocarbon chain.

In an alternative method, a carboxylic acid breaker can be generated by acid hydrolysis:
[—$CH_2$—CH(CONH2)]n[—CH2-CH(OOCR")]m+H2O$\rightarrow$
[—$CH_2$—CH(CONH2)]n[—CH2-CH(OH)]$_m$+R"COOH of the vinyl alkanoate groups in a co-polymer with acrylamide: where R" is a linear or branched saturated hydrocarbon chain.

For example, the acid hydrolysis of a vinyl neodecanoate/acrylamide copolymer generates versatic acid, which, as shown in FIG. 6, is an efficient breaker under low pH conditions. The tests reported in FIG. 6 were performed on a gelling composition containing 4.5 wt % erucyl methyl bis(2-hydroxyethyl) ammonium chloride (EMHAC), 1.5 wt % isopropanol, 0.5 wt % hm-polyacrylamide and 3 wt % ammonium chloride; the viscosity was measured at 25° C., under a shear rate of 1 s$^{-1}$.

EXAMPLE 6

Encapsulation

Figure 7:
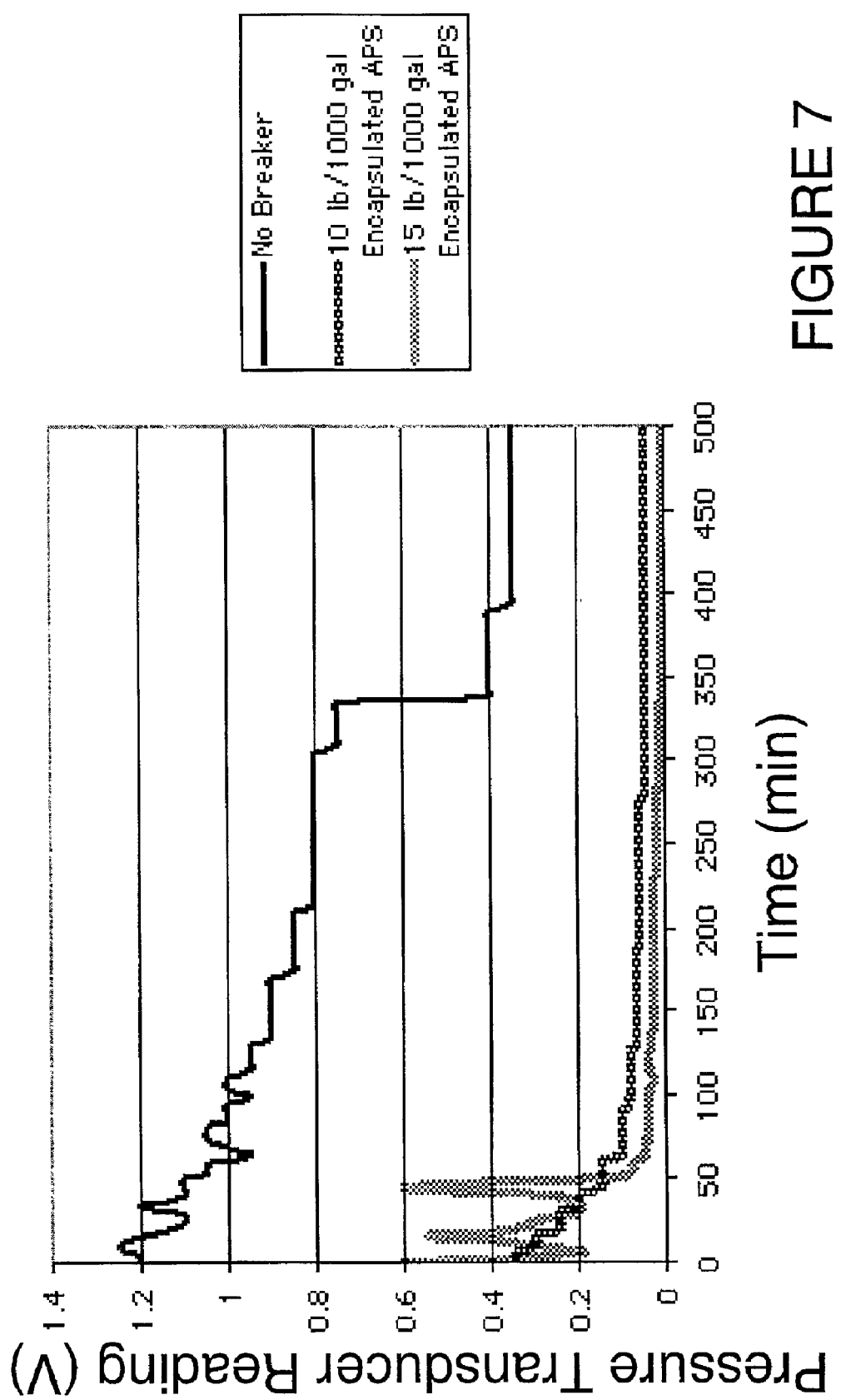
FIG. 7 shows the resistance to flow versus time of proppant packs that were treated with a viscoelastic surfactant fluid with and without encapsulated ammonium persulfate breaker agent.

A base viscoelastic surfactant fluid was prepared by adding to water 3 volume percent EMHAC and 3 weight percent ammonium chloride. This fluid was then used to perform two proppant-pack conductivity tests at 43° C. In these tests, a mixture of a viscous fluid and a proppant was loaded into a cell. The cell was then closed under pressure. Brine was then pumped through the cell and the pressure required to maintain a certain flow rate was measured over time. A decrease in the resistance to flow indicates that the viscous fluid is breaking. Displacement of the viscous fluid is termed cleanup. Encapsulated ammonium persulfate at a concentration of ten pounds/thousand gallons (10 lb/1000 gal) was added to the fluid as a breaker agent for one conductivity test and fifteen pounds/thousand gallons (15 lbs/1000 gal) was added in another. No additives were used in the control conductivity test. The proppant was 20/40 mesh Ottawa sand. The comparative results are shown in FIG. 7, where the resistance to flow or flowback pressure (indicated in volts on a pressure transducer) is plotted versus time and APS designates ammonium persulfate.

Upon closure during the conductivity test the encapsulated ammonium persulfate capsules broke and released the ammonium persulfate, which broke the viscoelastic surfactant fluid. It is evident that the initial cleanup pressure was substantially less when the breaker was present, and the time to achieve cleanup was significantly shorter.

EXAMPLE 7

Addition of Sodium Hexafluorophosphate

A base viscoelastic surfactant fluid was prepared by adding to water 2 volume percent EMHAC and 3 weight percent ammonium chloride. To portions of this fluid were added varying amounts of sodium hexafluorophosphate $NaPF_6$. The viscosity of the fluid was then determined at room temperature (about 21° C.) or at 60° C. The results are shown in Table 1 below.

TABLE 1

| Wt % NaPF$_6$ | cP at 21° C. | cP at 60° C. |
| --- | --- | --- |
| 0.00 | 165 | 96 |
| 0.03 | 45 | |
| 0.04 | 33 | |
| 0.05 | 12 | 33 |
| 0.06 | 6 | 15 |
| 0.07 | 6 | 12 |
| 0.08 | 6 | 9 |
| 0.10 | 6 | 3 |

This shows that sodium hexafluorophosphate is effective to break the gel and that the extent of the break can be controlled by varying the amount of salt. If encapsulated, the salt would be released as by fracture closure (crushing the capsules), and/or osmosis and/or dissolution.

EXAMPLE 8

Melting Point Released Alcohol

Figure 8:
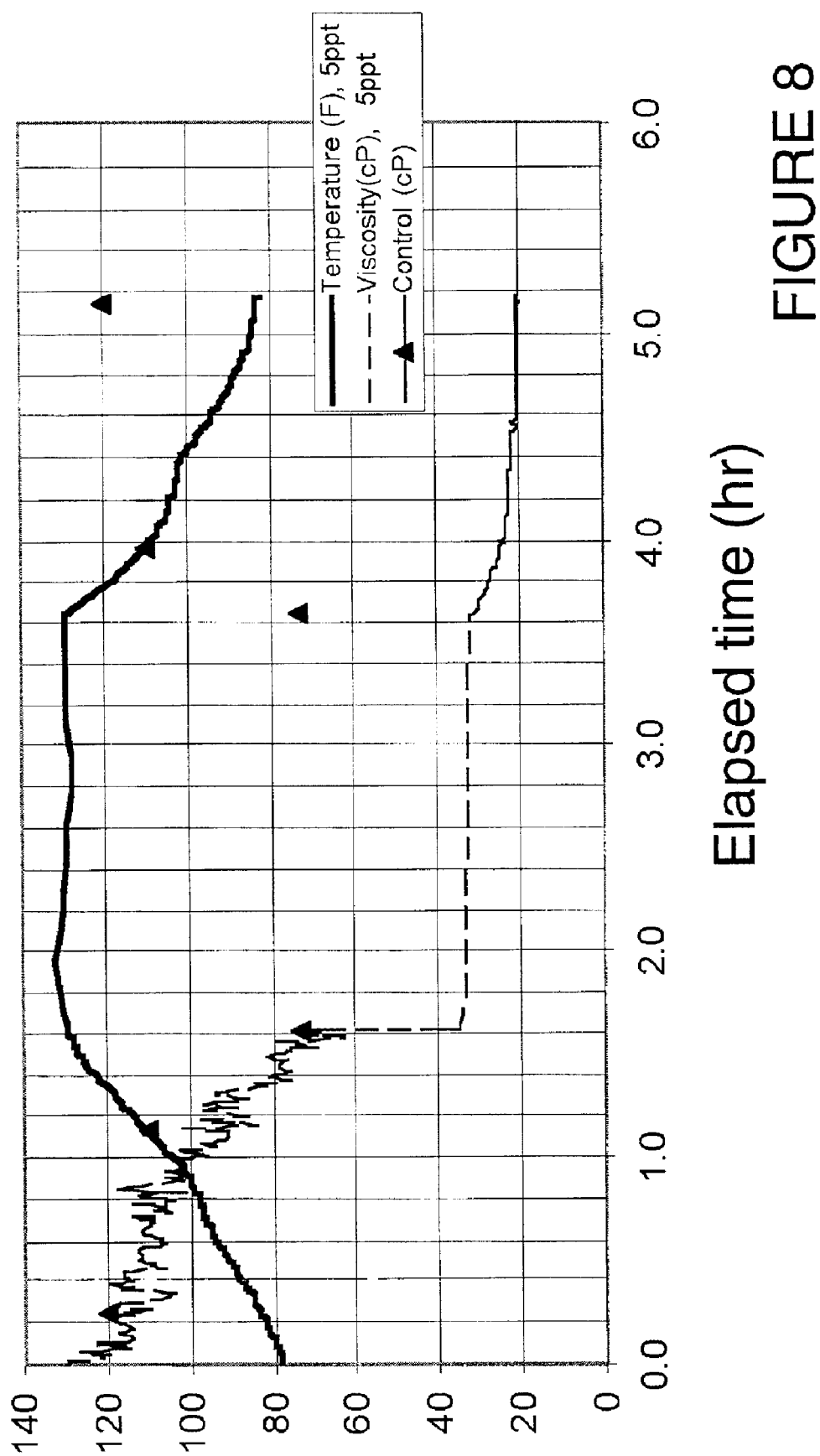
FIG. 8 shows the viscosity of a viscoelastic surfactant fluid containing a relatively high melting solid alcohol, the fluid being first heated and then cooled.

A base viscoelastic surfactant fluid was prepared by adding to water 2 volume percent EMHAC and 3 weight percent ammonium chloride. To this fluid, 5 lb/1000 gal of $C_{16}$–$C_{18}$ alcohol breaker with a melting point of about 45° C.±3° C. was added. A control fluid—without alcohol—and the tested fluid were placed in a reciprocating capillary viscometer and the viscosity was monitored as the fluid temperature was increased. The results are shown in FIG. 8. The labels left to the Y-axis represent the temperature in degrees Fahrenheit; the temperature curve—which shows that the maximal temperature was reached in about 2 hours—is represented by a bold line. The viscosity of the control fluid is represented by black triangles; the viscosity curve of the tested fluid is represented by a dotted line (no scale is provided for the viscosity measurements).

As the fluid temperature traversed the melting point of the alcohol, the fluid viscosity fell dramatically. Later in the test, the fluid temperature was lowered below the melting point of the alcohol. The fluid viscosity did not recover, indicating that the system's ability to form micelles was permanently destroyed.

EXAMPLE 9

Resin Coated Proppants

The settling tests were performed at room temperature using 200 ml graduated cylinders. The base viscoelastic surfactant fluid for all of these tests was 3 volume percent EMHAC and 4 wt % potassium chloride, with an initial viscosity of 168 cP at a shear rate of 170 $s^{-1}$ as measured on a Fann 35 viscometer. The proppant size used in all these tests was 20/40 mesh to ensure a comparable surface area. The resin content of the curable proppants used in this study varies from 1.8 to 4.0 wt % depending on the manufacturer's specifications, but was constant for each proppant type. The following mixing procedure was used: 200 ml of the fluid combined with 100 g proppant (equal to 4.2 ppg (pounds per gallon) proppant loading) was vigorously shaken in a beaker to obtain a homogenous suspension and transferred into a graduated 200 ml cylinder. The time for the visible separation and for the complete settling of the proppant was then observed. The viscosity of the overlaying fluid was measured by Fann 35 and compared to the initial viscosity of the fluid. Table 2 shows the settling times for curable resin coated proppants first, and then, for reference, typical settling times of uncoated proppants. "Visc. [cP] @ 170 $s^{-1}$" refers to the viscosity in centipoise at a shear rate of 170 $s^{-1}$. Proppants indicated as (Borden) were obtained from Borden Chemical, Inc, Oilfield Products, Houston, Tex.; proppants indicated as (Santrol) were obtained from Santrol, Fresno, Tex.; proppants indicated as (CARBO) were obtained from CARBO Ceramics Inc, Irving, Tex.

TABLE 2

|  | Visible Separation | Complete Settling | Visc. [cP] @ 170 $s^{-1}$ |
| --- | --- | --- | --- |
| Resin Coated Proppant |  |  |  |
| SBU (Borden) | 3 hr. 14 min. | 4 hr. 28 min. | 33 |
| SBU 6000 (Borden) | 7 hr. 16 min. | 21 hr. 53 min. | 33 |
| CR4000 D (Borden) | 3 hr. 40 min. | 4 hr. 37 min. | 39 |
| opti-prop | 3 hr. 54 min. | 5 hr. 23 min. | 33 |
| SHS (Santrol) | 20 min. | 40 min. | 30 |
| SDC (Santrol) | 2 hr. 2 min. | 2 hr. 55 min. | 36 |
| Super-LC (Santrol) | 1 hr. 8 min. | 1 hr. 47 min. | 33 |
| Super TF (Santrol) | 4 hr. 4 min. | 7 hr. 18 min. | 87 |
| CR4000 D | 3 hr. 40 min. | 4 hr. 37 min. | 39 |
| AcFrac (Borden) | 5 hr. 42 min. | 7 hr. 23 min. | 36 |
| Uncoated Proppant |  |  |  |
| CarboPROP (CARBO) | <23 hr. 23 min. | 30 hr. 8 min. | 159 |
| CarboHSP (CARBO) | 1 hr. 51 min. | 4 hr. 22 min. | 153 |
| CarboECONOPROP (CARBO) | 6 hr. 6 min. | 28 hr. 50 min. | 156 |
| CarboLITE (CARBO) | 21 hr. 39 min. | 27 hr. 57 min. | 153 |

Figure 9:
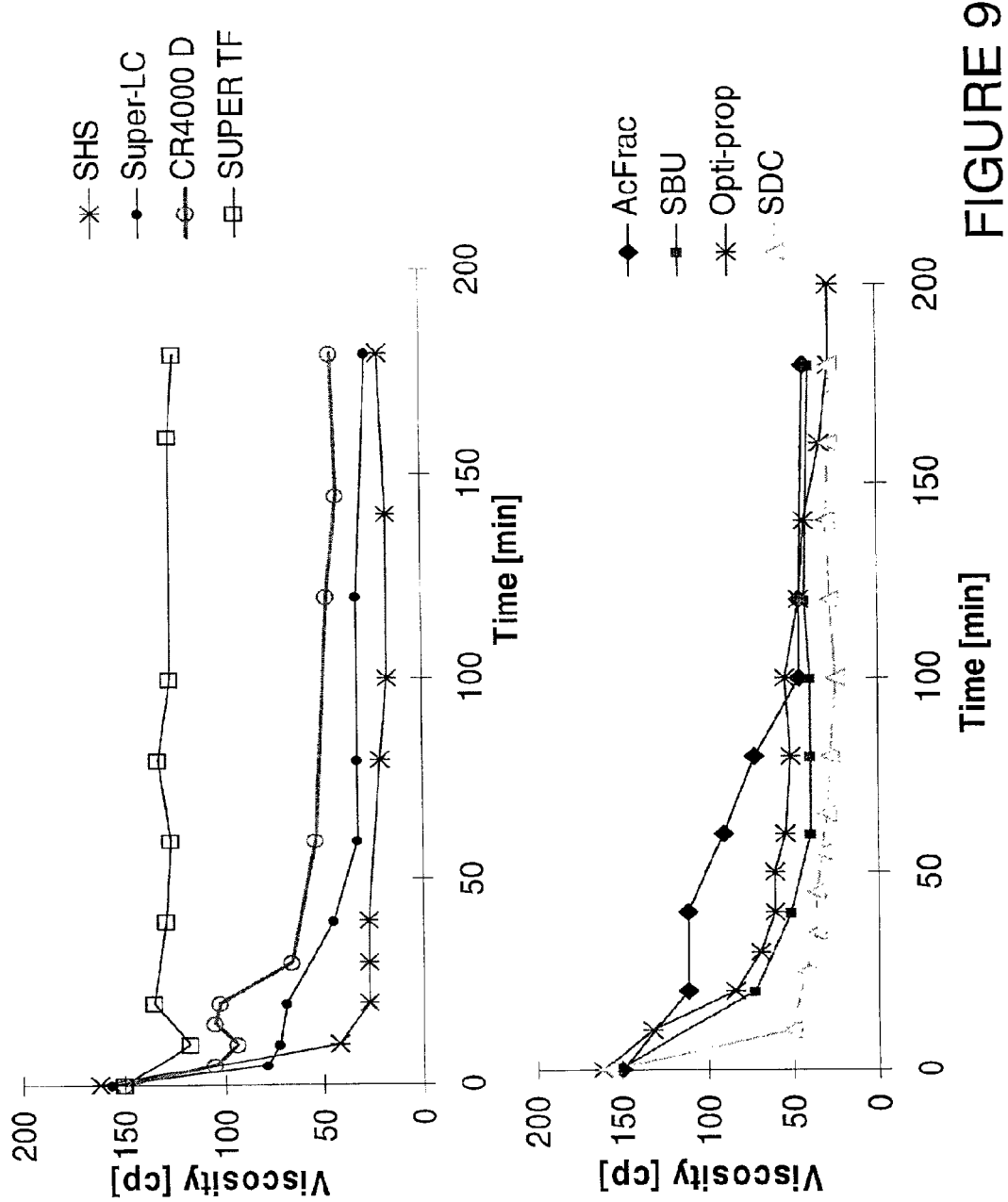
FIG. 9 shows kinetics of viscosity breakdown of the viscoelastic surfactant fluid in presence of curable proppants.

FIG. 9 shows the kinetics of the viscosity breakdown of the VES fluid in the presence of curable proppants (4.2 ppg proppant loading). For the sake of clarity in understanding this figure, FIG. 9 has been split. FIG. 9 is based on the results of tests above and is supported by the results shown in Table 2.

EXAMPLE 10

Slowly Soluble Compounds

A base viscoelastic surfactant fluid was prepared by adding to water 3 volume percent EMHAC and 3 wt % ammonium chloride. To this fluid was added 1 volume percent liquid dodecyl amine, which was immiscible and formed an emulsion with the base fluid. This fluid was then stored at 60° C. The viscoelastic surfactant fluid was observed to break after 4 hours.

EXAMPLE 11

Slow Decomposition of Compounds

Figure 10:
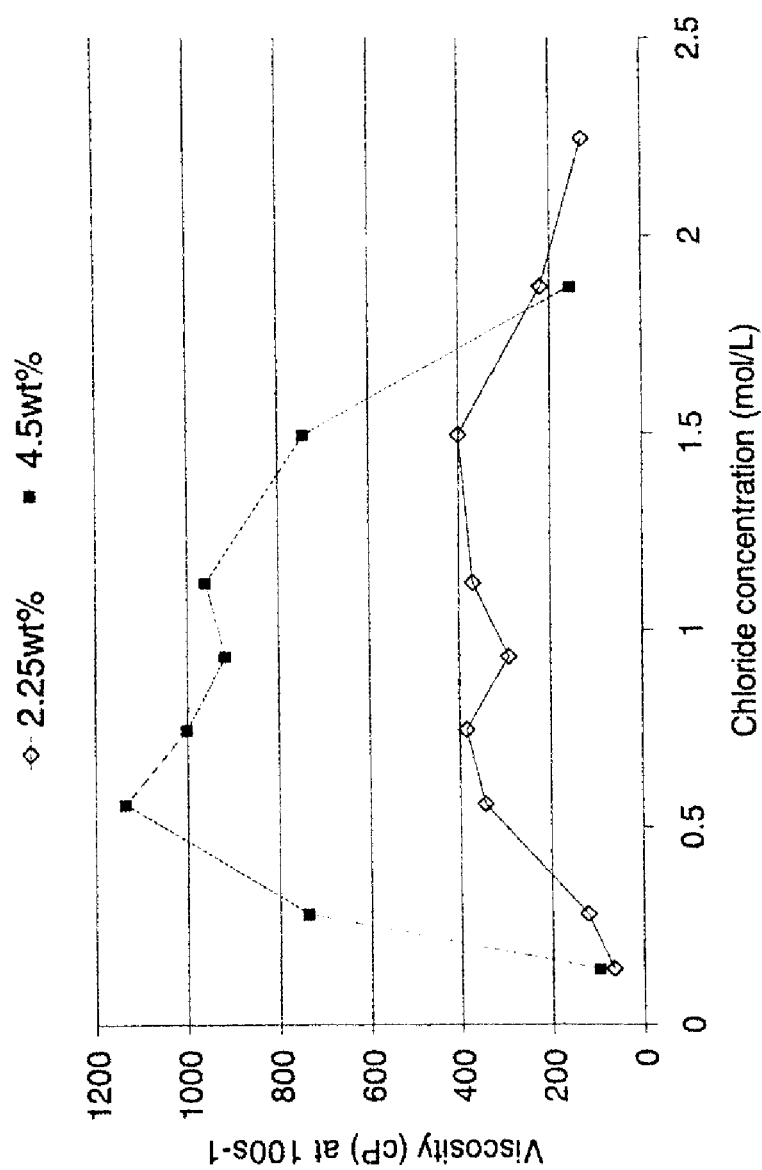
FIG. 10 shows the viscosity as a function of chloride concentration for solutions containing 2.25 wt % and 4.5 wt % EMHAC surfactant, respectively.

FIG. 10 demonstrates how the release of chloride affects the viscosity of a viscoelastic surfactant. The lower curve (marked by diamonds) corresponding to a concentration of 2.25 wt % EMHAC and the upper curve (solid squares), corresponding to a concentration of a 4.5 wt % EMHAC, show the viscosity development with increasing chloride content. The graphs show that the viscosity of the solution reaches a maximum between 0.6 to 0.8 wt % salt concentration to decrease rapidly at chloride concentration values beyond 1.5 wt %. To achieve the necessary change in salt concentration, it is contemplated to add an alkyl halide, preferably an alkyl chloride to the VES solution.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A method of treating a subterranean formation, said treatment selected among hydraulic fracturing, acid fracturing and comprising the step of injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, wherein said precursor releases an amount, sufficient to reduce the viscosity of the fluid, of a breaking system by at least one of the following processes: melting, slow dissolution, and de-adsorption of a breaking agent absorbed into solid particles.

2. The method of claim 1, wherein said breaking system is selected among at least one of the following salts: ammonium persulfate, potassium chloride, sodium hexafluorophosphate and sodium salicylate and wherein said salts are provided under an encapsulated form.

3. The method of claim 1, wherein said breaking system is a by-product of the reaction of resin-coated proppant.

4. A method of treating a subterranean formation, said treatment selected among hydraulic fracturing, acid fracturing and comprising the step of injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, wherein the viscoelastic surfactant is a zwitterionic surfactant and the breaking system is citric acid.

5. The method of claim 1, wherein the breaking system is released in an amount sufficient to reduce the viscosity of the fluid by melting a precursor, said precursor consisting of at least one of the following: a $C_{12}$ to $C_{18}$ alcohol, alkyl amines, alkanes, alkenes, aromatics and mixtures thereof.

6. The method claim 1, wherein the viscoelastic surfactant is anionic and/or cationic and the breaking system is released by dissolution of at least a surfactant having hydrophilic headgroups oppositely charged to the hydrophilic headgroups of the anionic or cationic surfactants of the viscoelastic surfactant fluid.

7. A method of treating a subterranean formation, said treatment selected among hydraulic fracturing, acid fracturing and comprising the step of injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, wherein said breaking system comprises alcohol released from a precursor consisting of a $C_{18}$ to $C_{20}$ alkyl sulfate or mixture thereof.

8. A method of treating a subterranean formation, said treatment selected among hydraulic fracturing, acid fracturing and comprising the step of injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, wherein said breaking system is released by slow dissolution in an amount sufficient to reduce the viscosity of the fluid, and is at least one of the following: alkyl amines; alkanes, alkenes and aromatics.

9. The method of claim 8, wherein the breaking system is dodecyl amine.

10. The method of claim 7, wherein the breaking system or the precursor of the breaking system is provided in the form of nanoparticles.

11. A method of treating a subterranean formation, said treatment selected among hydraulic fracturing, acid fracturing and comprising the step of injecting down a well an aqueous fluid comprising a thickening amount of a viscoelastic surfactant comprising providing a breaking system or a precursor of a breaking system that causes a reduction in viscosity of the fluid after its injection but does not significantly impact its viscosity surface and during the injection, wherein the breaking system reduces the low shear viscosity and is added to the viscoelastic fluid during the pad or the pre-pad stage.

12. The method of claim 11, wherein the breaking system does not substantially reduce high shear viscosity.

13. A method of treating a subterranean formation by first injecting, down a well, a solid-free aqueous fluid comprising a thickening amount of a cationic viscoelastic surfactant and an alcohol, selected among methanol and ethanol, and then, a proppant-containing aqueous fluid comprising a thickening amount of said cationic viscoelastic surfactant.

14. The method of claim 13, wherein the cationic viscoelastic surfactant is erucyl methyl bis(2-hydroxyethyl) ammonium chloride.

15. A composition for treating a subterranean formation comprising an aqueous fluid comprising a thickening amount of viscoelastic surfactant and a precursor of a breaking system that causes a reduction in viscosity of the fluid, said precursor of the breaking system comprising resin-coated proppant.

16. A composition for treating a subterranean formation comprising an aqueous fluid comprising a thickening amount of a viscoelastic surfactant and a precursor of a sufficient amount of a breaking system to cause reduction in viscosity of the fluid, said precursor of the breaking system comprising at least one of the following: a $C_{12}$ to $C_{18}$ alcohol, alkyl amines, alkanes, alkenes, aromatics and mixtures thereof.

17. A composition for treating a subterranean formation comprising an aqueous fluid comprising a thickening amount of an anionic and/or cationic viscoelastic surfactant and a precursor of a breaking system that causes a reduction in viscosity of the fluid, said precursor of the breaking system being a slow-soluble surfactant having hydrophilic headgroups oppositely charged to the hydrophilic headgroups of the anionic or cationic surfactants of the viscoelastic surfactant fluid.

18. A composition for treating a subterranean formation comprising an aqueous fluid comprising a thickening amount of a viscoelastic surfactant and a precursor of a breaking system that causes a reduction in viscosity of the fluid, said precursor of the breaker system being provided in the form of nanoparticles.

19. A method of treating a subterranean formation by injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, wherein said breaking system is a by-product of the reaction of resin-coated proppant.

20. A method of treating a subterranean formation by injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, said breaking system released in an amount sufficient to cause a reduction in viscosity of the fluid by melting a precursor, said precursor consisting of at least one of the following: a $C_{12}$ to $C_{18}$ alcohol, alkyl amines, alkanes, alkenes, aromatics and mixtures thereof.

21. A method of treating a subterranean formation by injecting down a well an aqueous fluid comprising a thickening amount of a viscoelastic anionic and/or cationic surfactant comprising providing a precursor of a breaking system that causes a reduction in viscosity of the fluid after its injection but does not significantly impact its viscosity at surface and during the injection, said breaking system released by dissolution of at least a surfactant having hydrophilic headgroups oppositely charged to the hydrophilic headgroups of the anionic or cationic surfactants of the viscoelastic surfactant fluid.

22. A method of treating a subterranean formation by injecting down a well an aqueous fluid comprising a thickening amount of a viscoelastic surfactant comprising providing a precursor of a breaking system that causes a reduction in viscosity of the fluid after its injection but does not significantly impact its viscosity at surface and during the injection, wherein said breaking system comprises alcohol released from a precursor consisting of a $C_{18}$ to $C_{20}$ alkyl sulfate or mixture thereof.

23. A method of treating a subterranean formation by injecting down a well an aqueous fluid comprising a thickening amount of a viscoelastic surfactant comprising providing a breaking system a precursor of a breaking system that causes a reduction in viscosity of the fluid after its injection but does not significantly impact its viscosity at surface and during the injection, wherein the breaker system or the precursor of the breaker system is provided in the form of nanoparticles.

\* \* \* \* \*